UNITED STATES PATENT OFFICE.

HENRY A. COOKE, OF OCALA, FLORIDA.

COMPOUND FOR MAKING BRICKS, ARTIFICIAL STONE, &c.

SPECIFICATION forming part of Letters Patent No. 303,213, dated August 5, 1884.

Application filed March 26, 1884. (No specimens.)

*To all whom it may concern:*

Be it known that I, HENRY A. COOKE, of Ocala, in the county of Marion, and in the State of Florida, have invented certain new and useful Improvements in Compounds for Making Bricks, Artificial Stone, &c.; and I do hereby declare that the following is a full, clear, and exact description thereof.

My invention relates to compounds for making brick or artificial stone; and the object I have in view is to make bricks in localities, more particularly, where suitable clay cannot be obtained readily.

To enable others to make brick according to my invention, I will proceed to give the ingredients which I use and the mode of compounding them.

I first take one barrel of unslaked lime, which I place in a suitable bed. Upon this I pour sufficient water to cover it, or make a milk of lime. To this I add four (4) pounds of pulverized rosin, which is thoroughly dissolved and incorporated by the heat of the lime. When the lime is slaked, I add thirty (30) pounds of oxide of iron, (or, as an equivalent, a similar quantity of Cleveland-ore paint,) and then six or seven barrels of silica or sand, according to quality. These ingredients, after being thoroughly mixed, are allowed to stand for about twenty-four hours. After standing, I add one-half (½) barrel of Portland or other suitable cement and one-fourth (¼) of a barrel of gypsum, which have previously been mixed. The entire mass is then placed in a suitable machine, and by any of the well-known means thoroughly mixed and incorporated, sufficient water, if necessary, being added to form a heavy thick mortar. This mortar is then either pressed into molds by power or molded by hand. Water is sometimes used in the drying process, to keep the brick from drying too rapidly.

Any suitable coloring-matter may be used to suit the fancy. The oxide of iron gives a red color to the brick similar to that of an ordinary clay brick.

Having thus fully described my invention, what I claim as new, and desire to secure by Letters Patent, is—

1. The herein-described compound, consisting of slaked lime, rosin, silica or sand, oxide of iron, gypsum, and cement, properly mixed, in the proportions substantially as and for the purpose set forth.

2. The herein-described method of making bricks, consisting in, first, slaking a sufficient quantity of lime, during which operation a quantity of pulverized rosin is added, the heat melting and thoroughly mixing it; then is added oxide of iron and silica or sand; then, after standing a time, is added to the compound a mixture of cement and gypsum, the entire mass then being thoroughly mixed and molded and allowed to dry slowly, substantially as and for the purpose specified.

In testimony whereof I affix my signature in presence of two witnesses.

HENRY A. COOKE.

Witnesses:
LOUIS FOX,
J. ISRAEL.